(12) United States Patent
Anand

(10) Patent No.: US 10,579,967 B2
(45) Date of Patent: Mar. 3, 2020

(54) SYSTEM AND METHOD FOR CREATING, EXECUTING AND MANAGING PROCESSES USING NANO SERVER ARCHITECTURE

(71) Applicant: P. Ashok Anand, Chennai (IN)

(72) Inventor: P. Ashok Anand, Chennai (IN)

(73) Assignee: P. Ashok Anand, Chennai (IN)

( * ) Notice: Subject to any disclaimer, the term of this patent is extended or adjusted under 35 U.S.C. 154(b) by 235 days.

(21) Appl. No.: 15/515,490

(22) PCT Filed: Nov. 14, 2014

(86) PCT No.: PCT/IN2014/000721
§ 371 (c)(1),
(2) Date: Mar. 29, 2017

(87) PCT Pub. No.: WO2016/051419
PCT Pub. Date: Apr. 7, 2016

(65) Prior Publication Data
US 2017/0221000 A1    Aug. 3, 2017

(30) Foreign Application Priority Data

Sep. 30, 2014    (IN) .......................... 4903/CHE/2014

(51) Int. Cl.
*G06Q 10/10*    (2012.01)
*G05B 19/042*   (2006.01)
(Continued)

(52) U.S. Cl.
CPC ....... *G06Q 10/103* (2013.01); *G05B 19/0421* (2013.01); *G06F 16/256* (2019.01); *G06Q 10/067* (2013.01); *G05B 2219/32136* (2013.01)

(58) Field of Classification Search
None
See application file for complete search history.

(56) References Cited

U.S. PATENT DOCUMENTS

| 8,706,798 B1 | 4/2014 | Suchter et al. |
| 2011/0055385 A1 | 3/2011 | Tung et al. |

(Continued)

OTHER PUBLICATIONS

Valancius et al., "Greening the Internet with Nano Data Centers", CoNEXT '09, pp. 37-48, Dec. 1-4, 2009.
(Continued)

*Primary Examiner* — Esther B. Henderson
(74) *Attorney, Agent, or Firm* — GableGotwals

(57) ABSTRACT

A system and method for creating, executing and managing processes of cross-enterprise businesses using nano server architecture, is disclosed herein. A process store tool (e.g., a graphical interface visual tool) at the end-user (such as, a business entity or an individual process developer) provides an open, flexible workflow engine for supporting the creation and enforcement of at least one business process with respect to the end user. A cluster having at least one nano server (also referred as 'lean server') configured within a data centre for storing, executing and managing processes with respect to the end user within the cloud environment. The nano servers of the cluster are the micro app servers with a small memory foot print consuming minimal resources. The nano servers are multi-threaded processes which houses the services that is consumed by the end user.

9 Claims, 3 Drawing Sheets

(51) Int. Cl.
*G06F 16/25* (2019.01)
*G06Q 10/06* (2012.01)

(56) References Cited

U.S. PATENT DOCUMENTS

| | | |
|---|---|---|
| 2013/0238788 A1 | 9/2013 | Caminiti et al. |
| 2016/0006821 A1* | 1/2016 | Anand .................. H04L 67/10 709/225 |

OTHER PUBLICATIONS

Fainman et al., "Directing Data Center Traffic", Science, vol. 342, pp. 202-203, Oct. 11, 2013.

* cited by examiner

SYSTEM AND METHOD FOR CREATING, EXECUTING AND MANAGING PROCESSES USING NANO SERVER ARCHITECTURE

CROSS-REFERENCE TO RELATED APPLICATIONS

This United States application is the National Phase of PCT Application No. PCT/IN2014/000721 filed 14 Nov. 2014, which claims priority to Indian Patent Application No. 4903/CHE/2014 filed 30 Sep. 2014, each of which is incorporated herein by reference.

TECHNICAL FIELD

Embodiments are generally related to data processing systems and methods. Embodiments are also related to cloud computing platforms and networks. Embodiments are additionally related to systems and methods for creating, executing and managing processes within a cloud environment.

BACKGROUND OF THE INVENTION

With the advent of modernization in business organizations and networks, businesses increasingly depend upon highly automated data acquisition and control systems to ensure that the processes are run efficiently, safely and reliably while lowering their overall production costs. In recent past, businesses have evolved from monolithic entities to multiple interdependent business networks. Such cross-enterprise businesses mostly depend on various processes including but not limited to, for example, supply chain managing management, R&D pipelining & execution, marketing activities, workflow methodologies, etc.

The business organizations typically require developing, executing and communicating processes that are developed for specific business requirements in order to align and increase the productivity of the organization. Such process driven business workflow monitoring, management, and control has become a significant issue in a business environment particularly characterized by low employee experience levels, low employee training, high employee turnover, large spans of control, many employees performing the same or related tasks, combines a business process of a sequence of processes that must be performed sequentially, according to a defined business process.

A business process management system and method is therefore required by such business organizations for creating, executing and managing the processes and to test the ability to define their enterprise business processes at increasing levels of granularity. Such business process management systems and methods when used in cross-business organizations for creating the processes may lead to heterogeneity of the computer systems, heterogeneity of the data used by the business networks, communication security and reliability issues between the systems, and various other legal, organizational and cultural issues between the business organizations.

Furthermore, it is highly difficult for small business organizations and individual process developers for creating, executing and testing the processes using conventional business process management systems. Also, the prior art process management and execution systems are unable to provide a one-stop solution for businesses to create and evaluate the processes within the business networks. Additionally, conventional process management systems and methods are unable to support diverse business processes defined by business organizations.

Based on the foregoing, it is believed that a need exists for an improved system and method for creating, executing and managing processes using nano server architecture. A need also exists for an improved business process management system for cross-enterprise processes, as described in greater detail herein.

SUMMARY OF THE INVENTION

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved system and method for creating, executing and managing processes.

It is another aspect of the disclosed embodiments to provide for an improved cloud based process management system and method.

It is further aspect of the disclosed embodiments to provide for an improved business process management system for cross-enterprise processes.

The aforementioned aspects and other objectives and advantages can now be achieved as described herein. A system and method for creating, executing and managing processes of cross-enterprise businesses using nano server architecture, is disclosed herein. A process store tool (e.g., a graphical interface visual tool) at the end-user (such as, a business entity or an individual process developer) provides an open, flexible workflow engine for supporting the creation and enforcement of at least one business process with respect to the end user. A cluster having at least one nano server (also referred as 'lean server') configured within a data centre for storing, executing and managing processes with respect to the end user within the cloud environment. The nano servers of the cluster are the micro app servers with a small memory foot print consuming minimal resources. The nano servers are multi threaded processes which houses the services that is consumed by the end user.

The business process management system and method described herein can be effectively employed in diverse business processes such as for example, but not limited to, workflow execution, web-based business applications, workflow spanning multiple systems, embedding business processes that have already been defined into new business processes, and management of work in process of the end users. The data centers having one or more clusters within the cloud network are constituted into a domain. A domain is the physical group of data centers representing formed to denote the geographic location of the domain.

The nano servers of the clusters are the least denominators in the physical infrastructure of the process management system. The nano servers proposed herein are capable of achieving high enterprise class security, high availability and scalability. A master server is designated within the cluster in order to track the configuration information with respect to the cluster, propagate changes in the cluster to other clusters of the data centre and tack the changes of other clusters in the data centre. The master server is also responsible for tracking and periodically checking the health of various active components of the cluster. The master server further tracks the transient information including server load, queue length, etc with respect to the nano servers within the cluster. The clusters having one or more nano servers communicate within the data centre via a bridge. The data centers within the domain communicate through a cluster gateway. The cluster gateways are made available to designated master servers of the clusters for tracking the status of the clusters within the data center.

The nano servers of the process management system can be a lean server having a micro app server with a small memory foot print consuming minimal resources of the process management system. The nano server can be a multi-threaded process having the services that is consumed by the end-user and is usually dedicated to a given user or a group of users of the cloud network. The nano servers provide high level of security in order to avoid unauthorized users to consume the services of the nano server. The nano server offers a wide range of essential services such as, but not limited to, database connection pools, authentication and authorization, msg encryption, msg compression, transaction co-ordination, third party integration, process execution, etc.

An OS message queue can act as an entry point of the nano server by not accepting the remote requests with respect to the nano server within the cluster. The nano servers are self contained having a security module (for authentication and authorization services), thread pool manager, process engine having a process execution layer, database connection pools, transaction co-ordination services, event serializers, task serializers, server monitor and reporting services, inter-process communication switches, etc. The bridge that is used to communicate between the clusters can act as a gate keeper for the nano servers within the cluster.

The bridge can be effectively used by the nano servers to communicate with other apps within the cloud network and/or 3$^{rd}$ party apps outside the cloud network. The bridge can be also used as an inter process communication switch to communicate with other processes and services within the nano servers. The nano servers also include a process engine module which can be a very light weight self contained process execution layer based on the BPMN standards with a few extensions. Every process engine instance can have its own memory stack/heap, publish/subscription services, queues, event co-ordination mechanism, integration modules, etc. The nano servers of the process management system also have a monitor for generating reports with respect to the exceptions, load parameters, queue sizes, thread pool size, active executions and other server specific information to the bridge.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and for components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
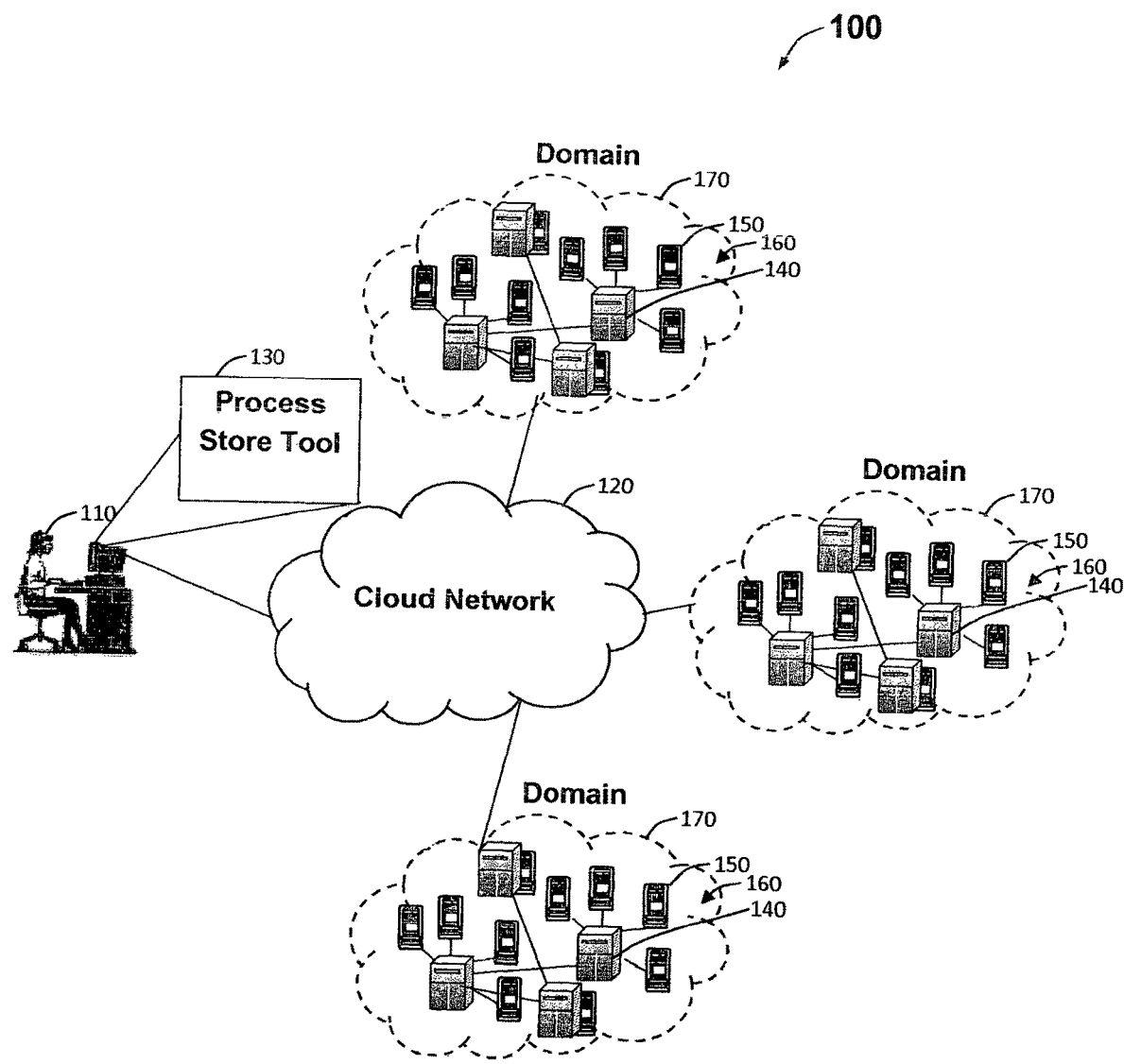
FIG. 1 illustrates a graphical representation of a process management system for creating, executing and managing processes with respect to a end user in cloud environment, in accordance with the disclosed embodiments.

FIG. 1 illustrates a graphical representation of a process management system 100 for creating, executing and managing processes with respect to an end user 110 in cloud environment 120, in accordance with the disclosed embodiments. The system 100 can be effectively employed in a wide range of process building and execution applications of cross-enterprise businesses using nano server architecture. The system 100 includes a process store tool 130 at the end-user 110 (such as, a business entity or an individual process developer) provides an open, flexible workflow engine for supporting the creation and enforcement of at least one business process with respect to the end user 110.

Note that the process store tool 130 can be such as for example, a graphical interface visual tool at the end user 110. The process store tool 130 can be a graphical user interface supporting diverse, multi-task, multi-thread business processes across various lines of business and multiple enterprises. The process management system 100 described herein can be employed for modeling and/or monitoring the business processes characterized by having linked procedures to realize a business objective. The method includes defining the business process by enumerating the steps within the business process. Each step in the process flow is logically linked, and includes one start, where a start defines the conditions to be met to initiate the business process. The process flow also includes one or more tasks, where a task is an activity that must be executed as part of the process.

The process flow has decision points, where a decision point is a point where a work item will branch off to different steps, with each branch having one or more conditions that must be met for a piece of work to follow the branch. The process flow also includes various sub processes, where a sub process is a previously defined business process, and exceptions, where an exception is the handling of an unexpected condition. The process store tool also supports tasks such as, for example, but not limited to notifications, inserts, updates, deletions, report generations, assignments, integration message requests, server tasks, and custom actions, etc.

A cluster 140 having at least one nano server 150 (also referred as 'lean server') configured within a data centre 160 for storing, executing and managing processes with respect to the end user 110 within the cloud environment 120. The nano servers 150 of the cluster 140 are the micro app servers with a small memory foot print consuming minimal resources. The nano servers 150 are multi threaded processes which houses the services that is consumed by the end user 110.

The business process management system 100 described herein can be effectively employed in diverse business processes such as for example, but not limited to, workflow execution, web-based business applications, workflow spanning multiple systems, embedding business processes that have already been defined into new business processes, and management of work in process of the end users 110. The data centers 160 having one or more clusters 140 within the cloud network 120 are constituted into a domain 170. A domain 170 is the physical group of data centers 160 representing formed to denote the geographic location of the domain 170.

Figure 2:
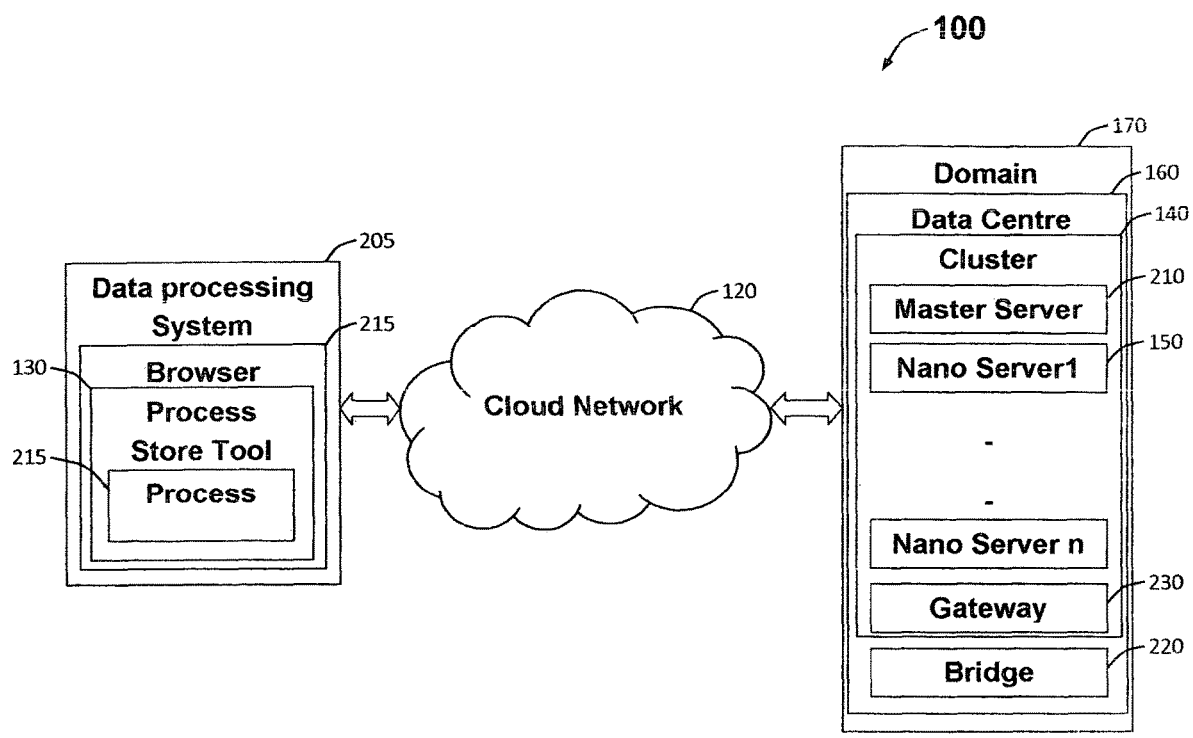
FIG. 2 illustrates a block diagram of a process management system for creating, executing and managing processes with respect to a end user in cloud environment, in accordance with the disclosed embodiments.
Figure 3:
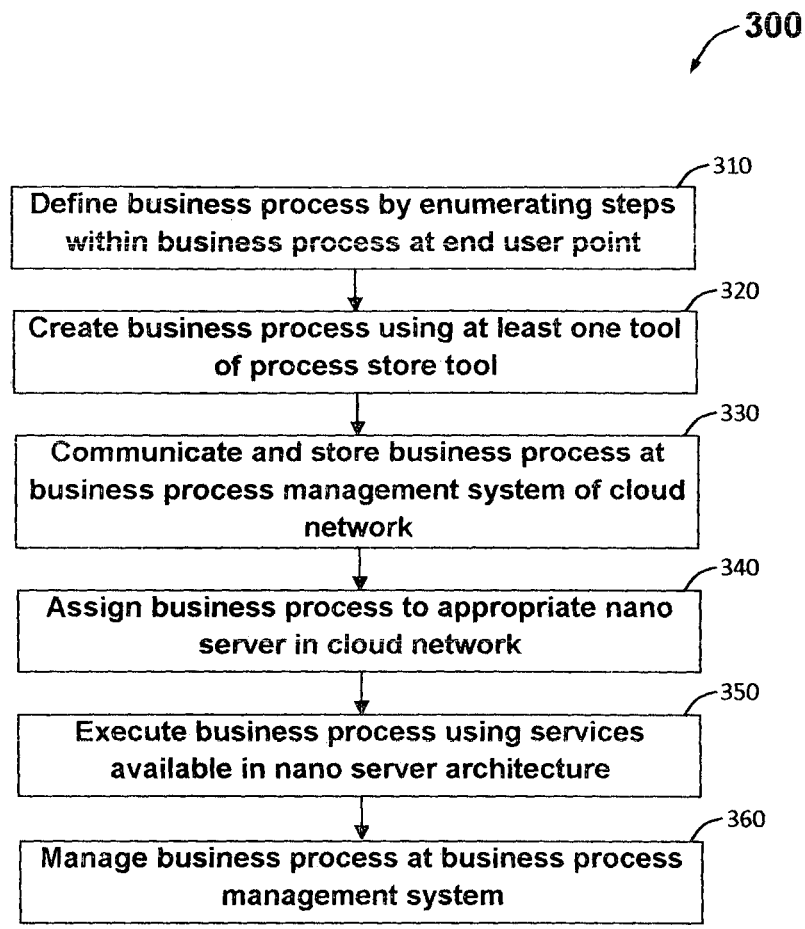
FIG. 3 illustrates a high level flow chart of operations illustrating logical operational steps of a method for creating, executing and managing business processes using nano server architecture, in accordance with the disclosed embodiments.

FIG. 2 illustrates a block diagram of a process management system 100 for creating, executing and managing processes with respect to the end user 110 in the cloud environment 120, in accordance with the disclosed embodiments. Note that in FIGS. 1-3 identical or similar components are indicated with identical numerical. FIGS. 1-3 are intended as an example, and not as an architectural/procedural limitation with respect to particular embodiments. Such embodiments, however, are not limited to any particular application or any particular computing or data-processing environment. Instead, those skilled in the art will appreciate that the disclosed system and method may be advantageously applied to a variety of system and application software. Moreover, the present invention may be embodied on a variety of different computing platforms, including Macintosh, Windows, UNIX, LINUX, and the like. The following discussion is intended to provide a brief, general description of suitable computing environments in which the system and method may be implemented.

The process store tool 150 can be accessed via a data processing system 205 having a browser tool 215 at the user end 110. Note that the data processing system 205 may be, for example, personal computers or network computers users accessing the server/nodes of the clusters for data, such as boot files, operating system images, and applications with respect to the clients. Note that the system 100 may include additional clusters, server/nodes, clients, and other devices not shown. In the depicted example, the cloud network can be an Internet with a worldwide collection of networks and gateways that use the Transmission Control Protocol/Internet Protocol (TCP/IP) suite of protocols to communicate with one another.

At the heart of the Internet is a backbone of high-speed data communication lines between major nodes or host computers, consisting of thousands of commercial, government, educational, and other computer systems that route data and messages. Of course, cloud network also may be implemented as a number of different types of networks, such as for example, an intranet, a local area network (LAN), or a wide area network (WAN). FIG. 2 is intended as an example, and not as an architectural limitation for embodiments of the present invention.

The nano servers 150 of the clusters 140 are the least denominators in the physical infrastructure of the process management system 100. The nano servers 150 proposed herein are capable of achieving high enterprise class security, high availability and scalability. A master server 210 is designated within the cluster 140 in order to track the configuration information with respect to the cluster 140, propagate changes in the cluster 140 to other clusters 140 of the data centre 160 and tack the changes of other clusters 140 in the data centre 160.

The master server 210 is also responsible for tracking and periodically checking the health of various active components of the cluster 140. The master server 210 further tracks the transient information including server load, queue length, etc with respect to the nano servers 150 within the cluster 140. The clusters 140 having one or more nano servers 150 communicate within the data centre 160 via a bridge 220. The data centers 160 within the domain 170 communicate through a cluster gateway 230. The cluster gateways 230 are made available to designated master servers 210 of the clusters 140 for tracking the status of the clusters 140 within the data center 160.

The nano servers 140 of the process management system 100 can be a lean server having a micro app server with a small memory foot print consuming minimal resources of the process management system 100. The nano server 150 can be a multi-threaded process having the services that is consumed by the end-user 110 and is usually dedicated to a given user or a group of users of the cloud network 120. The nano servers 150 provide high level of security in order to avoid unauthorized users to consume the services of the nano server 150. The nano server 150 offers a wide range of essential services such as, but not limited to, database connection pools, authentication and authorization, msg encryption, msg compression, transaction co-ordination, third party integration, process execution, etc.

An OS message queue can act as an entry point of the nano server 150 by not accepting the remote requests with respect to the nano server 150 within the cluster 140. The nano servers 150 are self contained having a security module (for authentication and authorization services), thread pool manager, process engine having a process execution layer, database connection pools, transaction co-ordination services, event serializers, task serializers, server monitor and reporting services, inter-process communication switches, etc. The bridge 220 that is used to communicate between the clusters 140 can act as a gate keeper for the nano servers 150 within the cluster 140.

The bridge 220 can be effectively used by the nano servers 150 to communicate with other apps within the cloud network 120 and/or $3^{rd}$ party apps outside the cloud network 120. The bridge 220 can be also used as an inter process communication switch to communicate with other processes and services within the nano servers 150. The nano servers 150 also include a process engine module which can be a very light weight self contained process execution layer based on the BPMN standards with a few extensions. Every process engine instance can have its own memory stack/heap, publish/subscription services, queues, event co-ordination mechanism, integration modules, etc. The nano servers 150 of the process management system 100 also have a monitor for generating reports with respect to the exceptions, load parameters, queue sizes, thread pool size, active executions and other server specific information to the bridge 220.

FIG. 3 illustrates a high level flow chart of operations illustrating logical operational steps of a method 300 for creating, executing and managing business processes using nano server architecture 100, in accordance with the disclosed embodiments. The method 300 described herein can be deployed as process software in the context of a computer system or data-processing system as that depicted in FIGS. 1-3. The business processes with respect to the end user 110 such as for example, a business organization and/or an individual business process developer can be defined at the end user point in alignment with the business requirement. Note that the business process management system and method described herein can be effectively employed in diverse business processes such as for example, but not limited to, workflow execution, web-based business applications, workflow spanning multiple systems, embedding business processes that have already been defined into new business processes, and management of work in process of the end users.

The business processes can be created using at least one service tool available at the nano server 150 of the business process management system 100, as depicted at block 320. Again as a reminder, note that the process store tool 130 can be a graphical user interface supporting diverse, multi-task, multi-thread business processes across various lines of business and multiple enterprises. The business processes created and stored at the end user 110 can be further stored into the cloud network 120, as illustrated at block 330.

The business process can be further assigned to an appropriate nano server 150 in the cloud network 120 in order thereby execute the business process using services available at the nano server 150, as depicted at blocks 340 and 350 respectively. Finally, the processes can be further managed at the business process management system 100 for further storing, executing and managing processes with respect to the end user 110 within the cloud environment 120, as illustrated at block 360.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

I claim:

1. A method for creating, executing and managing processes of cross-enterprise businesses using nano server architecture, said method comprising:
   providing an open, flexible workflow engine for supporting the creation and enforcement of at least one business process with respect to an end user using a process store tool; and
   storing, executing and managing processes with respect to the end user within a cloud environment using a cluster having at least one nano server configured within a data centre, wherein said at least one nano server of said at least one cluster can be a micro app server with a small memory foot print consuming minimal resources.

2. The method of claim 1, wherein said at least one nano server can be multi-threaded process which houses services consumed by the end user.

3. The method of claim 1, wherein said data centers having one or more clusters within the cloud environment are constituted into a domain wherein said domain is a physical group of data centers formed to denote a geographic location of the domain.

4. The method of claim 1, wherein said at least one nano server of the cluster is least denominators in a physical infrastructure of a process management system, wherein the at least one nano server is capable of achieving high enterprise class security, high availability and scalability.

5. The method of claim 1, wherein said at least one nano server is a master server designated within the cluster to track a configuration information with respect to the cluster, propagate changes in the cluster to other clusters of the data centre and track changes of other clusters in the data centre.

6. The method of claim 5, wherein said master server is also responsible for tracking and periodically checking health of various active components of the cluster.

7. The method of claim 5, wherein said master server tracks transient information including server load, queue length, with respect to the at least one nano servers within the cluster.

8. The method of claim 1, wherein said at least one nano server is a lean server having a micro app server with a small memory foot print consuming minimal resources of the process management system.

9. The method of claim 1, wherein said at least one nano server include a process engine module which is a lightweight self-contained process execution layer based on the business process model and notation standards with a few extensions, wherein said process engine may include members selected from the group consisting of memory stack/heap, publish/subscription services, queues, event co-ordination mechanism, and integration modules.

* * * * *